United States Patent [19]
Roy

[11] Patent Number: 6,073,330
[45] Date of Patent: Jun. 13, 2000

[54] PRECISION INDEXING OF A TURNTABLE USED IN A HINGE-POSITIONER FIXTURE

[75] Inventor: Michael Roy, Brampton, Canada

[73] Assignee: DaimlerChrysler Corporation, Auburn Hills, Mich.

[21] Appl. No.: 09/277,883

[22] Filed: Mar. 29, 1999

[51] Int. Cl.[7] .................................................. B23P 19/00
[52] U.S. Cl. ............................. 29/281.5; 29/464; 33/600; 33/645
[58] Field of Search .................................. 29/11, 709, 714, 29/715, 434, 281.1, 281.5, 464; 33/194, 600, 608, 645, 667, 568, 569, 570

[56] References Cited

U.S. PATENT DOCUMENTS

| | | | |
|---|---|---|---|
| 2,295,247 | 9/1942 | Wessman | 33/569 |
| 4,058,885 | 11/1977 | Bergman . | |
| 4,375,716 | 3/1983 | Armstrong et al. | 29/464 |
| 4,606,244 | 8/1986 | Schneemann | 74/816 |
| 4,860,424 | 8/1989 | Kaibuki et al. | 29/434 |
| 4,905,884 | 3/1990 | Alborante et al. . | |
| 5,203,814 | 4/1993 | Kushizaki et al. . | |
| 5,829,123 | 11/1998 | Shashlo et al. | 29/714 |

FOREIGN PATENT DOCUMENTS

| | | |
|---|---|---|
| 7-328864 | 12/1995 | Japan . |
| 8-039364 | 2/1996 | Japan . |

*Primary Examiner*—S. Thomas Hughes
*Assistant Examiner*—Eric Compton
*Attorney, Agent, or Firm*—Lawrence J. Shurupoff

[57] ABSTRACT

A turntable for an adjustable peg system in a hinge-positioner fixture can be accurately located in selected positions of adjustment by using a powered locator pin in combination with a powered lock pin. The locator pin can be powered into a convergent socket in the table, to exert a cam force that rotates the turntable an incremental distance into a position, wherein a lock opening on the turntable is accurately aligned with a powered lock pin. The lock pin is driven into the lock opening to retain the turntable in a desired position of adjustment.

6 Claims, 4 Drawing Sheets

PRECISION INDEXING OF A TURNTABLE USED IN A HINGE-POSITIONER FIXTURE

CROSS-REFERENCE TO RELATED APPLICATIONS

This application is related to co-pending U.S. patent applications, Ser. No. 09/279,900, filed on Mar. 29, 1999, entitled "Adjustable Locator Mechanism for a Hinge Positioner Fixture," Ser. No. 09/280,950, filed on Mar. 29, 1999, entitled "Mechanism for Positioning a Pair of Hinges on an Automobile Body," Ser. No. 09/280,951, filed on Mar. 29, 1999, entitled "Mechanism for Removing a Hinge-Positioner Fixture from an Automobile Body," Ser. No. 09/277,884, filed on Mar. 29, 1999, entitled "Stabilizing Mechanism for a Hinge Positioner Fixture."

BACKGROUND OF THE INVENTION

1. Field of the Invention

This invention relates to a mechanism for positioning a pair of hinges on an automobile body so that the hinges can be fastened to the body in precise operating positions. The invention can be used on various types of auto bodies, e.g. passenger cars, trucks, or vans.

2. Description of Prior Developments

In the automobile production process the door hinges are sometimes installed on the automobile body while the body is in an unpainted condition on a moving conveyor. The hinges are usually installed on the auto body before the doors have been fastened to the hinges.

SUMMARY OF THE INVENTION

The present invention relates to a mechanism for positioning a pair of hinges on an auto body along one edge of a door opening so that the hinges are aligned in proper operating position before the hinges are fastened to the body.

The mechanism of the present invention includes a fixture movable to a clamped condition on the auto body, and means on the fixture for releasably holding a pair of hinges in a predetermined position on the fixture, so that when the fixture is clamped to the auto body the hinges will be aligned in desired positions on the auto body. The fixture is preferably suspended from an overhead balancing device, whereby a human operator can manipulate the fixture without having to carry the entire fixture weight. The overhead balancing device allows the fixture to be moved with the automobile body while the body is being moved on a conveyor past the hinge attachment station.

The invention has a semi-automatic operational mode, such that the fixture is automatically clamped to the auto body when a human operator has been able to manipulate the fixture to a predetermined position on the auto body. The human operator can concentrate on manipulating the fixture without having to worry about using one hand to control or operate the clamping mechanism.

The mechanism for releasably holding the door hinges on the fixture includes a magnetic mechanism for temporarily retaining the hinges on the fixture when the hinges are manually placed on the fixture, and a powered mechanism for securely holding the hinges in desired positions after the fixture has been clamped to the auto body. An aim of the invention is to free the hands of the human operator for easier manipulation of the fixture into a desired final position on the auto body.

The fixture preferably has two spaced pegs for accurately locating the fixture on an automobile before the fixture is clamped to the body. The pegs are insertable into pre-formed locator holes in the automobile body, such that when the fixture is subsequently clamped to the body, the fixture will be in the desired position for accurate position of the hinges.

In some automobile manufacturing operations, different automobile body styles (or models) are assembled on a given production line (or conveyor). The different body configurations follow one another on the conveyor in random fashion. Thus, a first body style can follow directly behind a second body style, and a third body style can follow directly behind the first body style, on an irregular basis.

The hinge locations on the automotive body can be slightly different on the different body styles while maintaining a constant spacing between the upper and lower hinges. The present invention includes an adjustable peg system on the hinge-supporting fixtures for accurately locating the fixture on the side surfaces of various model (style) automotive bodies.

With the adjustable peg system, the peg spacing can be changed by the human operator after each body style passes beyond the hinge-installation station, such that the peg spacing conforms precisely to the locator hole spacing on the next automotive body approaching the hinge-installation station. If the next automotive body happens to be the same body style as the body leaving the hinge-installation station, the human operator keeps the same peg spacing. Adjustment of the peg spacing does not require any slow down or change in the conveyor system. Peg spacing adjustment is quickly accomplished by selective manual actuation of a control switch on the fixture.

In one fixture design, a peg-spacing adjustment action is achieved by using a turntable for selectively positioning different pegs in operative alignment with either the front locator hole or the rear locator hole in the automotive body. Each peg on the turntable has a slightly different spacing relative to the peg for the other locator hole.

The turntable is rotatably indexed to different positions in order to operatively align the associated pegs with the auto body locator holes. The present invention includes a precision locator mechanism for insuring a precise rotation of the turntable to the various indexed positions. In one arrangement, the locator mechanism includes a locator pin that can be powered into selected sockets in the turntable after the table has been indexed to approximately the target position. The locator pin exerts a cam action on the socket surface, so that the turntable is rotated an increment distance, to bring a lock opening in the turntable into precision alignment with a lock pin carried by a lock cylinder.

DESCRIPTION OF A PREFERRED EMBODIMENT OF THE INVENTION

Figure 1:
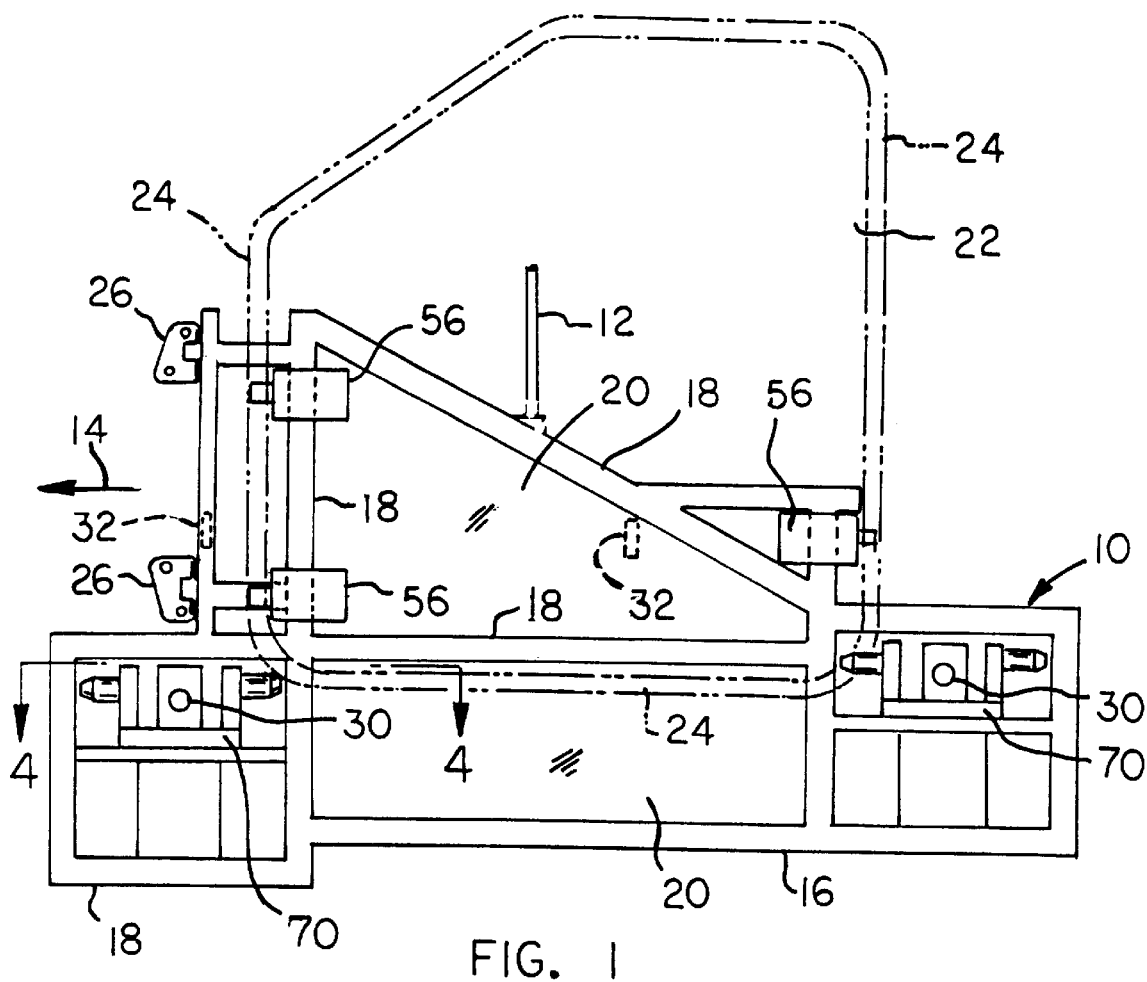
FIG. 1 is an elevational view of a hinge-positioning mechanism embodying the invention. An automobile door opening is superimposed in dashed lines on the mechanism to show the operational orientation of the mechanism relative to the automobile.

Referring to FIG. 1, there is shown a semi-automatic mechanism embodying the invention. The mechanism includes portable fixture 10 suspended from an overhead balancing device by a cable 12, whereby the fixture weight is carried by the balancing device, while permitting a human operator to move the fixture in three dimensions, i.e. into or out of the plane of the paper, up or down, and/or right and left.

Additionally, the overhead balancing device permits the fixture to be moved laterally with the automobile body, as the body is conveyed generally in the direction of arrow 14 (right-to-left in FIG. 1).

Fixture 10 includes a frame 16 formed of light weight aluminum tubes 18 suitably welded together in a uni-planar arrangement (i.e. vertically in FIG. 1). A fiat panel 20 is secured to one face of frame 16 to provide support for wiring and pneumatic hoses employed in the practice of the invention. Major operating components can be supported on the aluminum frame. The tubes used to form the frame are preferably formed of square cross-section tubing. Some frame elements can be formed out of aluminum bar stock.

As shown in FIG. 1, fixture 10 is positionable alongside an automobile body in facing relation to a door opening 22 defined by a peripheral flange 24 on the sheet metal portion of the body. The door opening depicted in FIG. 1 is designed to receive a front door at a subsequent point in the auto assembly process. The present invention is concerned with a mechanism for positioning two door hinges 26 on the auto body while the hinges are being fastened to the body, as by bolts or rivets (not shown). The fastening tool used for fastening the hinges is not part of the invention. FIG. 1 is taken from a point inside the automobile body, looking toward the hinge-positioning mechanism, with hinges 26 pre-located on the positioning fixture.

The invention includes two horizontally-spaced cylindrical pegs 30,30 supported by fixture 10 for insertion into pre-formed holes in the auto inner body, i.e. the body skeleton prior to placement of the fender panels and rocker panels on the skeleton. The pre-formed holes are covered by the outer rocker panel or fender panel at a later point in the manufacturing process.

Cylindrical pegs 30 are important in that they serve as locators for fixture 10 on the automobile body. The position of fixture 10 determines the position of hinges 26 on the automobile body. Placement of pegs 30,30 in the pre-formed holes in the auto body is accomplished by manual manipulation of fixture 10. Handles 32,32 on the hidden side of the fixture enable the human operator to manipulate the fixture to a desired position on the automobile body.

Prior to manipulation of fixture 10 into engagement with the auto body the two hinges 26,26 are manually placed on a hinge positioning mechanism 34 suitably affixed to frame 16. The two hinge-positioning mechanisms may be similarly constructed. A representative hinge-positioning means is shown in FIGS. 2 and 3.

Figure 2:
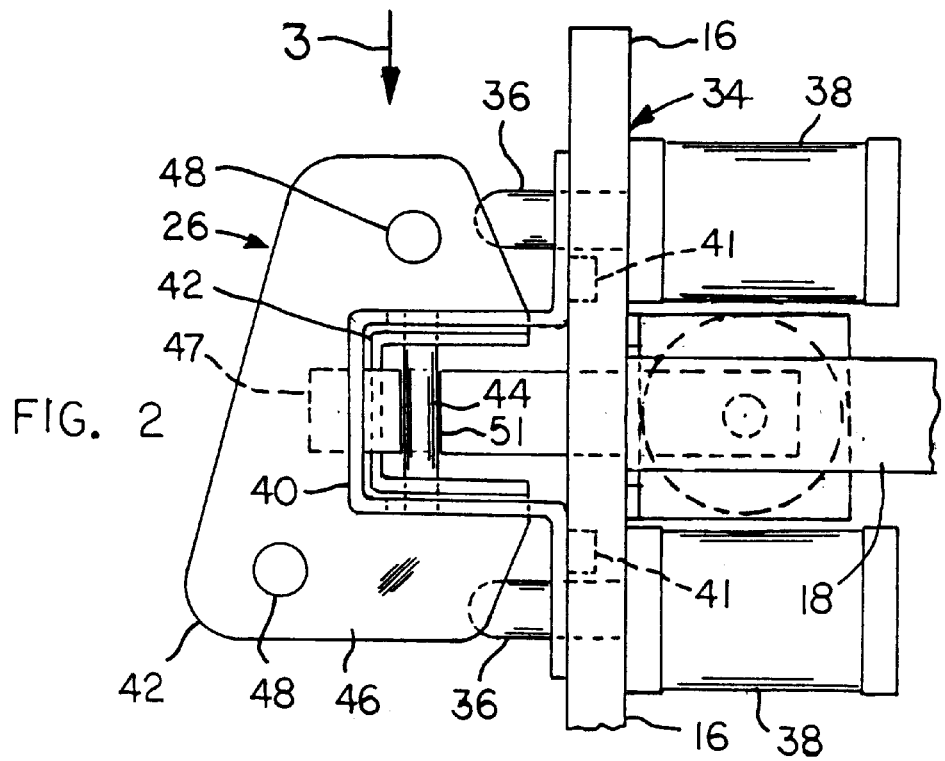
FIG. 2 is a view taken in the same direction as FIG. 1, but showing a hinge-holding mechanism enlarged.
Figure 3:
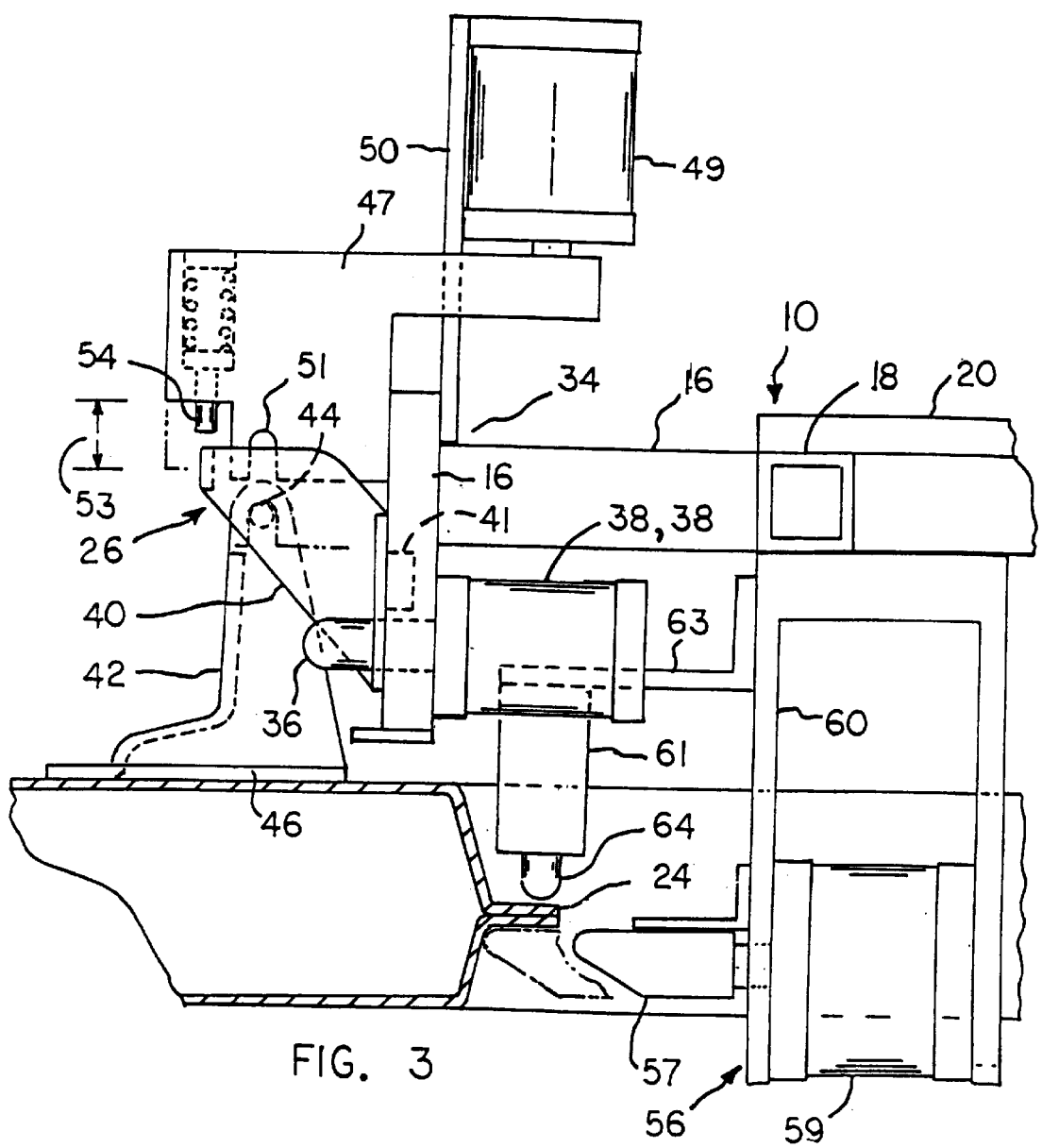
FIG. 3 is a fragmentary view taken in the direction of arrow 3 in FIG. 2.

The hinge-positioning mechanism 34 depicted in FIGS. 2 and 3 includes two cylindrical pins 36 affixed to the pistons of pneumatic cylinders 38 suitably mounted on frame 16. As shown in FIGS. 2 and 3, pins 36 are extended from frame 16 to pass through the fastener holes for the door section 40 of hinge 26. When the cylinders 38 are actuated to retract the pistons, pins 36 move into the frame 16 to free the hinge section from the frame. Each hinge is initially placed on frame 16 with pins 36 in the extended positions.

In order to ensure that hinge section 40 will remain on frame 16, two permanent magnets 41 are embedded, or otherwise attached, to the frame surface that receives the mounting flanges of the hinge door section 40. Magnets 41 act as magnetic clamps to releasably clamp hinge section 40 to frame 16. Pins 36 act as locators for hinge section 40.

Door section 40 of each hinge 26 is swingably connected to the associated auto body section 42 of the hinge by a hinge pin 44. Hinge section 42 has flanges 46 adapted to seat on the outer surface of the automobile body, as shown in FIG. 3. The hinge is secured to the auto body by bolts or rivets passed through fastener holes 48 (FIG. 2) in flanges 46. Any suitable powered fastener tool can be used to secure the hinge fasteners to the auto body.

To augment the clamping action of permanent magnets 41, there is provided a movable yoke 47 powered by a pneumatic cylinder 49. As shown in FIG. 3, cylinder 49 is mounted on a bracket 50 extending from the aluminum frame 16 (any suitable means can be used to mount the pneumatic cylinder). Yoke 47 includes a wall structure slidably supported on the left face of frame 16, whereby the yoke can slide on the frame linearly but cannot rotate around the cylinder 49 axis.

Yoke 47 has a notch or slot 51 adapted to partially encircle hinge pin 44 when cylinder 49 is actuated. FIG. 3 shows cylinder 49 in the retracted condition. When the cylinder is actuated (pressurized) yoke 47 advances downwardly through a stroke distance 53 (FIG. 3), whereby notch 51 partially encircles hinge pin 44. Yoke 47 prevents hinge section 40 from being displaced from its pre-located position on frame 16, especially when hinge section 42 is in the process of being fastened to the auto body. Additionally the yoke limits swinging motion of hinge section 42.

Yoke 47 is provided with a spring-biased abutment pin 54 that resiliently engages the web portion of the hinge section 40, so that the hinge assembly is indirectly brought into pressure contact with the auto body. Flanges 46 on hinges section 42 have pressure contact with the auto body surface while the hinge fasteners are being attached to the auto body. Pneumatic cylinder 49 can be actuated before, or after, frame 16 is manipulated to the desired position on the auto body (by causing cylindrical pegs 30 to enter into the pre-formed locator holes in the auto body).

Fixture 10 is equipped with three clamping mechanisms 56 for clamping the fixture to the auto body prior to the step of fastening hinges 26 to the body. As shown in FIG. 1, one of the clamping mechanisms 56 is located on frame 16 proximate to the uppermost hinge 26. A second clamping mechanism 56 is located on frame 16 near the lowermost hinge 26. A third clamping mechanism is located on frame 16 at the opposite edge of the door opening 24 (i.e. the edge of the door opening remote from the hinges). Each clamping mechanism may be similarly constructed.

FIG. 3 shows the general construction of the clamping mechanisms. The clamp mechanism includes a slidable clamp element 57 attached to the piston of a pneumatic cylinder 59 that is suitably mounted on a bracket 60 extending from frame 16. When cylinder 59 is energized (pressurized) clamp element 57 is extended to the dashed line position behind flange 24, thereby clamping fixture 10 to the auto body, with flanges 46 of each hinge 26 in firm contact with the auto body surface.

In order to ensure that all three pneumatic cylinders 59 are energized simultaneously at the optimum time in the cycle, the three cylinders 59 are collectively controlled by three separate proximity switches suitably mounted on frame 16 near the respective cylinders 59. FIG. 3 shows one proximity switch 61 attached to frame 16, via a bracket 63, so that the sensing head 64 of the switch is located near auto body flange 24 when frame 16 is in its desired position on the auto body, as determined by cylindrical pegs 30 in FIG. 1. Each proximity switch 61 is similarly mounted.

Each proximity switch 61 is adjusted so that when the associated clamp element 57 is in a plane behind flange 24 (as shown in FIG. 3) the sensing head 64 responds to the presence of auto body flange 24 to trigger the switch to the conductive state. Switches 61,61,61 are connected electrically in series in the control circuit for the valves that supply pressurized fluid to fluid cylinders 59, such that all three switches are required to be triggered before any of the cylinders are pressurized (actuated). All three cylinders are actuated simultaneously after fixture 10 assumes its final position on the auto body (as sensed by the three proximity switches 61).

The clamping action of clamp elements 57 occurs automatically when fixture 10 reaches the desired position on the auto body, since all three proximity switches 61 have to be triggered before the cylinders 59 are pressurized. The human technician can devote attention to the process of manipulating fixture 10, without having to worry about removing one hand from a handle 32 in order to manually operate a control switch. The operation saves time and ensures that fixture 10 will be in the correct position on the auto body when clamping mechanisms 56 are actuated.

After the two hinges 26 have been fastened to the auto body, a manual switch on fixture 10 can be operated to release t he mechanism from the auto body. A timer controlled by the manual switch can be employed to sequentially retract each yoke 47 from the associated hinge pin 44, and to retract hinge locator pins 36 from hinge sections 40. The timer can be further cycled to depressurize the three pneumatic cylinders 59, so that the human technician can remove fixture 10 from the auto body.

The entire process, from initial placement of hinges 26 on the locator pins 36 to final separation of fixture 10 from the auto body, can be accomplished relatively quickly while the automobile body is being moved along the conveyor line.

As noted earlier, the production line may have provisions for assembling more than one automotive body style. The spacing of hinges 26,26 on the body can be the same for all body styles, but in some cases the body contour can differ slightly, such that the spacing of pegs 30,30 is inappropriate for all of the body styles that might be encountered.

Figure 4:
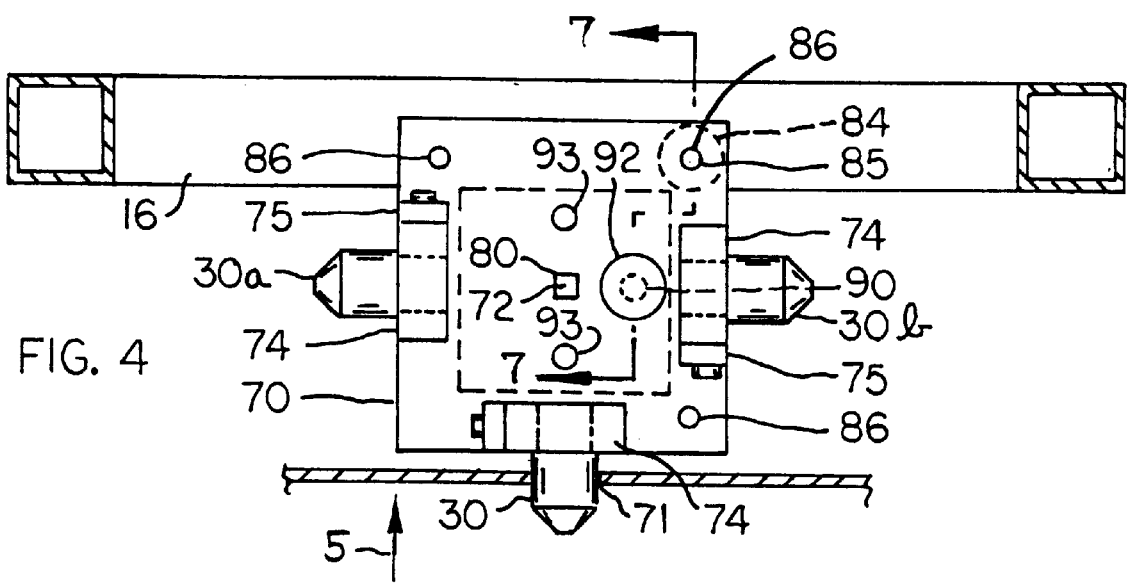
FIG. 4 is a plan view of a fixture-locator peg-adjustment mechanism employed in the FIG. 1 mechanism.
Figure 5:
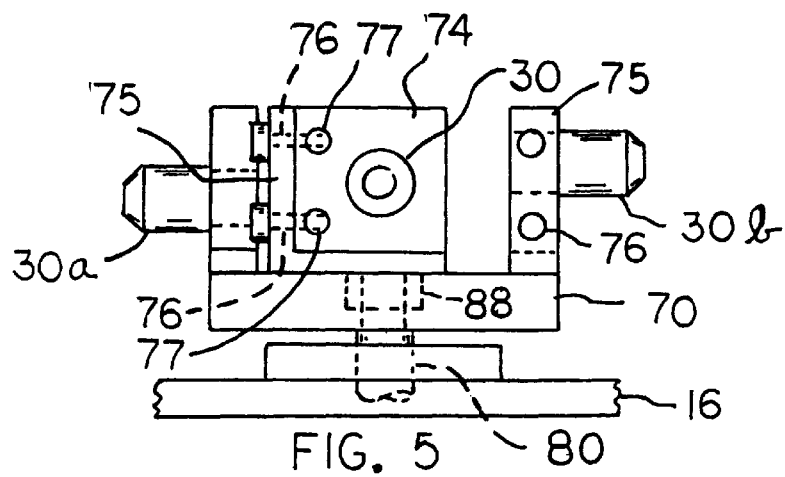
FIG. 5 is a fragmentary elevational view taken in the direction of arrow 5 in FIG. 4.
Figure 6:
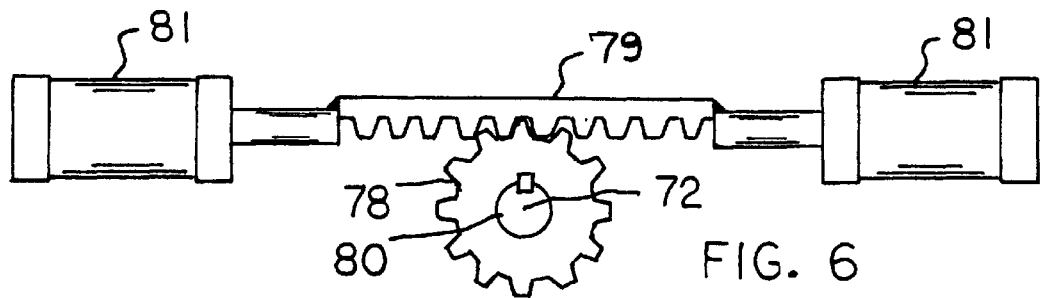
FIG. 6 is a fragmentary plan view of a powered actuator that can be used for adjusting the FIG. 4 mechanism.

The present invention includes a mechanism for adjusting the spacing between the front and rear fixture-locator pegs 30,30. FIGS. 4, 5 and 6 show one form that the peg-adjustment mechanism can take. The FIG. 4 mechanism can be used for the front peg 30 and/or the rear peg 30 (as the pegs are viewed in FIG. 1). When each peg is adjustable (as shown in FIG. 1) both pegs will be adjusted simultaneously, prior to manual manipulation of fixture 10 onto the side of the vehicle body. The peg-adjustment process takes place after one vehicle body leaves the hinge-installation station, and prior to arrival of the next vehicle body at the hinge-installation station.

The human operator visually observes the body style of the arriving vehicle body, and operates a single switch on fixture 10 to make the peg adjustment. Each vehicle body style has its own control switch on the back side of panel 20, such that the human operator is enabled to accomplish the peg-adjustment process quickly without undue effort.

FIG. 4 shows one adjustable peg system that can be used in practice of the invention The system includes three pegs 30, 30a, and 30b operatively mounted on a turntable 70, such that when the turntable is indexed through ninety degree increments around shaft axis 72, different ones of pegs 30, 30a, or 30b are presented to locator hole 71 in the automotive body.

Pegs 30, 30a, and 30b have slightly different orientations relative to the turntable, so that when the turntable is indexed through each ninety degree increment the peg spacing between the front and rear pegs in FIG. 1 is changed. FIG. 5 shows one way of mounting a peg on the turntable. As shown, the peg extends from a block 74 that is securely attached to an L-shaped bracket 75 by two screws 76. Bracket 75 is firmly secured to the upper surface of turntable 70.

The peg-support hole in block 74 is eccentric to the center axis of the block, so that the block can have different edge surfaces presented to the block-attachment surface on the vertical leg of bracket 75. It is thus possible to have the three pegs 30, 30a, and 30b slightly offset from one another relative to a given radial line generated from turntable rotational axis 72. As shown in FIG. 5, the pegs are offset from each other in the elevational direction. However, the pegs can also be offset in the horizontal plane, depending on the eccentricity of the peg-support hole and position of block 74 on bracket 75.

FIG. 6 shows a powered actuator that can be used to index turntable 70 through ninety degree increments around shaft 80 axis 72. A gear 78 on the shaft meshes with a toothed rack 79 that is affixed to the piston rods of two aligned pneumatic cylinders 81. When one cylinder is pressurized, gear 78 is rotated in a clockwise direction. When the other cylinder is pressurized the gear is rotated counterclockwise.

Rotation of gear 78 can be used to rotate turntable 70 in either direction from the central position depicted in FIG.4. Springs within the cylinders 81 can be used to return the turntable to the central position.

FIG. 4 shows an electrically-operated lock for releasably locking turntable 70 in the three selected positions of adjustment. A vertical-axis pneumatic cylinder 84 is suitably mounted on frame 16 for moving a lock pin 85 vertically between a retracted position spaced from the turntable lower surface and a lock position extending into selected lock openings 86 in the turntable.

The turntable is provided with three lock openings 86, one for each position of the turntable. Lock cylinder 84 is energized by an electrical control system that is timed by the control circuits for the valves that control cylinders 81, so that when the turntable reaches its target position, the lock cylinder 84 is energized to operate lock pin 85 to the lock position.

The rotary actuator depicted in FIG. 6 can be controlled to achieve reasonably accurate indexing actions on turntable 70. However play in gearing 78,79, and other factors, introduce a certain amount of imprecision in the indexing process. For example, when a cylinder 81 is energized to index the turntable to a position wherein peg 30a or 30b is presented to the locator hole 71, the turntable may slightly undershoot or overshoot the target position, such that cylinder 84 may not be able to directly lock pin 85 into the associated lock opening 86 in the turntable. The present invention includes a second powered locator pin 90 that is an axial extension of the piston rod of pneumatic cylinder 92. The function of locator pin 90 is to provide at least a rough preliminary position of the turntable to align a lock opening 86 with the lock pin 85 after each indexing stroke of the FIG. 6 actuator.

Turntable 70 is provided with three locator sockets 93 in its upper surface, spaced angulary ninety degrees apart, such that when the turntable is in any of its three designated positions one of the sockets will be aligned with the locator pin 90.

As shown in FIG. 4, locator cylinder 92 is located above the turntable so that locator pin moves downwardly during insertional movement of the locator pin into an associated socket 93. Lock cylinder 84 is located below the turntable so that lock pin 85 moves upwardly during insertional movement of the lock pin into an associated lock opening 86. The two pins 85 and 90 exert oppositely-acting pressure forces on the turntable, to reduce any tendency of the turntable to bend or wobble when the two cylinders 84 and 92 are actuated.

Figure 7:
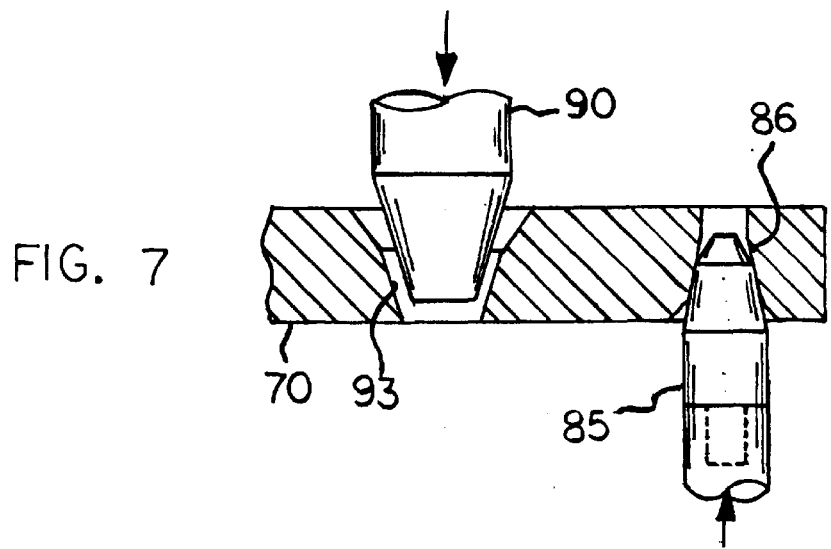
FIG. 7 is an enlarged fragmentary sectional view taken on line 7—7 in FIG. 4, showing the cooperative action of a powered locator pin and lock pin for accurately positioning the turntable shown in FIG. 4.

FIG. 7 shows the two pins 85 and 90 inserted into the associated openings 86 and 93 in turntable 70. Each pin is tapered in the direction of pin insertion (designated by arrows in FIG. 7). However, the taper angle of the locator pin 90 is greater than the taper angle of lock pin 86, in accordance with their different functions.

The function of locator pin 90 is to act as a cam for slightly rotating the turntable 70 to a position wherein lock opening 86 is in precision alignment with lock pin 85. The function of lock opening 86 is to achieve a snug fit on pin 85 when pin 85 is fired into opening 85 by lock cylinder 84.

The taper on lock pin opening 86 can vary from about five degrees to about fifteen degrees, sufficient to achieve a snug fit on the mating lock pin 85 without allowing the pin to back out of the opening. The taper on locator pin 90 and associated openings 93 is relatively great so that pin 90 is enabled to achieve an effective cam action on the turntable 70 when cylinder 92 fires pin 90 into an associated locator opening 93. The taper on pin 90 and each socket opening 93 is greater than the taper on pin 85. Preferably the taper on pin 90 is at least sixteen degrees.

Each opening 86 or 93 has an enlarged mouth that converges in the direction of pin insertion. The mouth diameter for each locator socket opening 93 is appreciably greater than the mouth diameter for each lock opening 86, in accordance with the different functions of the two openings.

During each operational cycle, the locator pin 90 is fired into an associated locator socket 93 before actuation of the lock cylinder 84. Therefore, the lock opening 86 is at least approximately aligned with pin 85 before lock cylinder 84 is actuated. Therefore, the enlarged mouth on lock opening 86 can be somewhat smaller than the enlarged mouth on each socket 93.

As shown in FIG. 7, the socket 93 has a diameter that is somewhat greater than the diameter of locator pin 90, such that there is a radial clearance between the socket and pin side surface. This is to compensate for manufacturing tolerances, so that lock pin 85 is ensured of having an accurate snug fit in lock opening 86, without interference by the locator pin 90.

As shown in FIG. 7, pin 90 is centered in socket 93. FIG. 7 represents the final target position for locator pin 90 (after pin 85 has been driven home to the lock position). Locator pin 90 preferably has a greater diameter than lock pin 85, since pin 90 would be expected to be subjected to greater load (cam) forces.

The drawings necessarily show a specific apparatus useful in practice of the invention. However, it will be appreciated that variants can be employed while still practicing the invention.

What is claimed:

1. Mechanism for positioning a pair of hinges on an automobile body adjacent to a door opening, comprising:

a hinge-support fixture movable to a predetermined position on an automobile body;

means for releasably locating said fixture in the predetermined position; and means for clamping said fixture to an automobile body, after the fixture has been located in the predetermined position;

said fixture locating means comprising a front peg assembly and a rear peg assembly, said peg assemblies comprising individual pegs insertable into spaced locator openings on an automobile body;

one of said peg assemblies comprising a rotary turntable mounted on said fixture, and plural pegs carried by said turntable;

a power actuator for rotating said turntable to different selected positions wherein different ones of said pegs can be inserted into different locator openings in different automobile style bodies; and means for locking said turntable in selected positions of adjustments; said locking means comprising a powered lock pin and plural angularly-spaced lock openings in the turntable selectively registerable with said powered lock pin, a powered locator pin and plural angularly-spaced sockets in said turntable selectively registerable with said powered locator pins;

each lock opening having a mouth that converges in the direction of lock pin insertion; each socket having a mouth that converges in the direction of locator pin insertion;

the lock opening mouth diameter being appreciable less than the socket mouth diameter, whereby the locator pin is enabled to rotate the turntable to positions wherein the lock pin has precision alignment with a selected lock opening.

2. The mechanism of claim 1, and further comprising means for operating the locator pin before the lock pin.

3. The mechanism of claim 1, wherein said locator pin has a radial clearance within each associated socket when the locator pin is in the inserted position.

4. The mechanism of claim 1, wherein said lock pin is slightly tapered in the direction of pin insertion whereby said lock pin has a snug fit in a associated lock opening; and said locator pin being tapered in the direction of pin insertion, whereby said locator pin is enabled to rotate the turntable by cam action when the locator pin is inserted into an associated socket;

the taper on said locator pin being appreciable greater than the taper on said locking pin.

5. The mechanism of claim 4, wherein the taper on said locator pin is at least sixteen degrees.

6. The mechanism of claim 1, wherein said powered lock pin is proximate to one face of the turntable, and said powered locator pin is proximate to another face of the turntable, whereby the two pins move in opposite directions during insertion into the turntable.

* * * * *